(12) United States Patent
Castro

(10) Patent No.: US 6,804,781 B1
(45) Date of Patent: Oct. 12, 2004

(54) SYSTEM AND METHOD FOR SECURITY OF INFORMATION IN A MEMORY

(75) Inventor: Eugene Villa Castro, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/435,782

(22) Filed: May 12, 2003

(51) Int. Cl.[7] .............................................. G06F 11/30
(52) U.S. Cl. ........................ 713/193; 380/201; 360/15; 711/163
(58) Field of Search .................... 455/419; 235/462.46; 380/201, 252; 713/201, 168, 189, 193; 711/163; 360/60, 15

(56) References Cited

U.S. PATENT DOCUMENTS

| | | | | |
|---|---|---|---|---|
| 6,144,848 A | * | 11/2000 | Walsh et al. ................. | 455/419 |
| 6,446,210 B1 | * | 9/2002 | Borza .......................... | 713/201 |
| 2001/0025343 A1 | | 9/2001 | Chrisop et al. ............. | 713/193 |
| 2002/0008145 A1 | * | 1/2002 | Walsh et al. ............ | 235/462.46 |
| 2002/0124177 A1 | * | 9/2002 | Harper et al. ................ | 713/189 |
| 2002/0129245 A1 | * | 9/2002 | Cassagnol et al. .......... | 713/168 |
| 2002/0131595 A1 | * | 9/2002 | Ueda et al. .................. | 380/201 |
| 2002/0171867 A1 | | 11/2002 | Nobuhara et al. ......... | 358/1.15 |
| 2002/0181134 A1 | | 12/2002 | Bunker et al. ................ | 360/60 |

OTHER PUBLICATIONS

Peter Gurmann, "Secure Deletion of Data from Magnetic and Solid–State Memory," Jul. 22–25, 1996, pp. 1–17.

* cited by examiner

*Primary Examiner*—Emmanuel L. Moise

(57) ABSTRACT

The present invention provides a system and method for securing confidential information. Briefly described, one embodiment comprises a memory configured to save the confidential information, a decryption key, and a processor configured to encrypt the confidential information when received, configured to store the encrypted confidential information in the memory, configured to decrypt the confidential information when the confidential information is accessed by another component, and further configured to erase the decryption key after a component has accessed the confidential information.

30 Claims, 4 Drawing Sheets

SYSTEM AND METHOD FOR SECURITY OF INFORMATION IN A MEMORY

TECHNICAL FIELD

The present invention is generally related to printers and communication devices, and, more particularly, is related to a system and method for securing confidential information in a nonvolatile internal memory.

BACKGROUND

A variety of devices are configured to receive information and/or capture image information. Examples of such devices include print devices, copy machines, personal device assistants (PDA), facsimile (FAX) machines and scanners. Typically, the information is further processed for some intended purpose. Examples of information include data, text and/or images in electronic format or in a hardcopy format.

A common feature of the above-described devices is that the device employs an internal memory that "temporarily" stores the information while further processing occurs. For example, one type of print device employs a magnetic disk drive memory that receives the information from a remote source, which is then printed. Such a memory acts as a "buffer" for the temporary storage of the information. As later information is received, the prior information is overwritten.

Memories may be nonvolatile. In a nonvolatile internal memory, the information is retained after power is removed from the memory. An example of a nonvolatile memory is a writable magnetic disk drive. Other examples of nonvolatile memories include, an optical drive, a compact discs (CD), a digital versatile disks (DVD), a floppy disk, a magnetic tape drive, an erasable programmable read-only memory (EPROM), an electrically erasable programmable read-only memory (EEPROM), a flash memory, a nonvolatile random access memory, and various types of volatile memories that become nonvolatile by virtue of a battery backup or other power source that is maintained when the device is inactive.

When the device is deactivated, such as by turning off the power, any saved information currently residing in the nonvolatile internal memory is retained. Accordingly, confidential information received by the device may remain in the nonvolatile internal memory. The user would prefer that the confidential information be removed from the nonvolatile internal memory or otherwise be destroyed. That is, the user of the device intends that the information remain confidential and not be available to unauthorized third parties.

The above-described nonvolatile internal memory to a device is not generally electronically accessible to an unauthorized third party because there is no way for the third party to exert control over the nonvolatile internal memory using external programs. For example, if a print device receives information from a personal computer, the print job origination program residing in the personal computer is limited to sending information to the print device in a suitable electronic format for printing images. Examples of print job origination programs include word processing programs, browsers, photo editors, and graphic/drawing programs. Since the print job origination program does not have direct control over the nonvolatile internal memory residing in the print device, there is no convenient way for an unauthorized third party to cause the printer to print confidential information residing in the nonvolatile internal memory.

Furthermore, such nonvolatile internal memories are not readily accessible to physical access. That is, the memory is difficult to physically remove from the device. However, if the nonvolatile internal memory is physically removed from the device, a variety of techniques are available for retrieving the information from the memory. Accordingly, if an unauthorized third party "steals" the nonvolatile internal memory after the confidential information is received by the device (and before additional information is received which would otherwise overwrite the confidential information), the confidential information can be accessed.

Accordingly, it is desirable to protect confidential information received by a device and residing in a nonvolatile internal memory. That is, it is desirable to prevent access to confidential information residing in a nonvolatile internal memory by an unauthorized third party.

SUMMARY

The present invention provides a system and method for securing confidential information. Briefly described, one embodiment comprises a memory configured to save the confidential information, a decryption key, and a processor configured to encrypt the confidential information when received, configured to store the encrypted confidential information in the memory, configured to decrypt the confidential information when the confidential information is accessed by another component, and further configured to erase the decryption key after a component has accessed the confidential information.

Another embodiment comprises encrypting the confidential information, storing the encrypted confidential information in a memory, generating a decryption key, decrypting the encrypted confidential information using the decryption key; and erasing the decryption key.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention.

DETAILED DESCRIPTION

Figure 1:
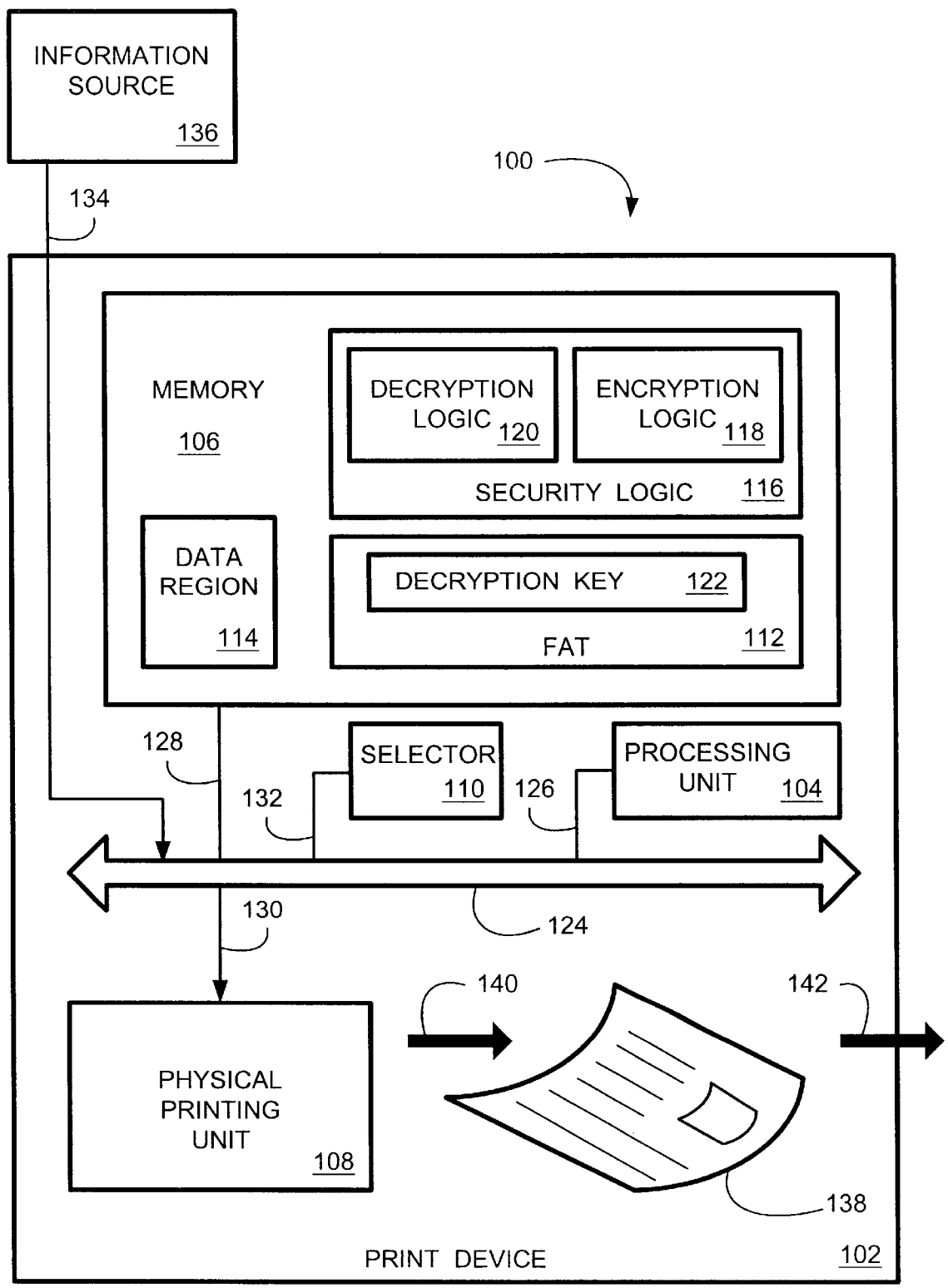
FIG. 1 is a block diagram illustrating an embodiment of a memory security device in accordance with the present invention implemented in a print device.

FIG. 1 is a block diagram illustrating an embodiment of a memory security device 100 in accordance with the present invention implemented in a print device 102. The embodiment illustrated in print device 102 includes a processing unit 104, memory 106, a physical printing unit 108, and an optional selector 110. Memory 106 further includes regions allocated for a file allocation table (FAT) 112, data region 114 and security logic 116. Security logic 116 includes encryption logic 118 and decryption logic 120. A portion of the FAT 112 is employed for storing a decryption key 122. In one embodiment, memory 106 is a nonvolatile internal memory.

Processing unit 104, memory 106, physical printing unit 108 and selector 110 are coupled to communication bus 124 via connections 126, 128, 130 and 134, respectively. In alternative embodiments of print device 102, the above-described components are connectively coupled to each other in a different manner than illustrated in FIG. 1. For example, one or more of the above-described components may be directly coupled to processing unit 104 or may be coupled to processing unit 104 via intermediary components (not shown).

Memory 106 is a nonvolatile memory device. In a nonvolatile internal memory, the information is retained after power is removed from the memory. An example of a nonvolatile memory is a writable magnetic disk drive. Other examples of nonvolatile memories include, but are not limited to, an optical drive, a compact discs (CD), a digital versatile disks (DVD), a floppy disk, a magnetic tape drive, an erasable programmable read-only memory (EPROM), an electrically erasable programmable read-only memory (EEPROM), a flash memory, a nonvolatile random access memory, and various types of volatile memories that become nonvolatile by virtue of a battery backup or other power source that is maintained when the device is inactive.

The processing unit 104 is typically a commercially available processing unit having many associated components not illustrated for convenience. Examples of commercially available processing units include, but are not limited to, a Pentium microprocessor from Intel Corporation, Power PC microprocessor, SPARC processor, PA-RISC processor or 68000 series microprocessor. Many other suitable processing units are also available. Or, processing unit 104 may be a specially designed and fabricated processing unit in accordance with the present invention.

Print device is configured to couple to, via connection 134, information source 136. Information source 136 provides electronic information that is to be printed onto a sheet of paper 138 by the physical printing unit 108. The information may be data, textual and/or an image, referred to herein as "information" for convenience because an image corresponding to the received information is printed onto the sheet of paper 138. Non-limiting examples of information source 136 include a browser retrieving information from the Internet or a personal computer (PC) retrieving information from a memory. Other examples include digital cameras, facsimile machines, video conferencing devices, telephones with image capture capability, personal device assistants (PDAs), copy machines or other multipurpose devices. It is understood that any suitable device may provide information in an electronic format to the print device 102.

Furthermore, it is understood that intermediary components (not shown for convenience) may be employed within print device 102 to communicatively couple the connection 134 to communication bus 124 so that received information may be processed in accordance with the present invention. Such additional components are not illustrated herein since they do not materially impact the present invention.

When information is received for printing, processing unit 104 retrieves and executes the security logic 116. Security logic 116 is executed to perform several operations. In one embodiment, execution of security logic 116 causes the generation of a random encryption key and a random decryption key 122. The decryption key 122 is saved into the FAT 112 at a suitable known location. In another embodiment, the encryption key may be predefined and repeatedly used.

The received information is encrypted using the encryption logic 118 and then saved into the data region 114 of memory 106. Thus, the encrypted confidential information is not useable to an unauthorized third party not in possession of decryption key 122. When the physical printing unit 108 is ready to print, the information is retrieved from the data region 114 and decrypted using the decryption logic 120 and the decryption key 122. Thus, the information is printed onto the sheet of paper 138 by the physical printing unit 108, as indicated by arrow 140, and then transported out of the print device, as indicated by arrow 142.

After the received confidential information has been printed, in one embodiment, the decryption key 122 is erased from the FAT 112. In one embodiment, the decryption key 122 is immediately erased after the confidential information is accessed for printing. In another embodiment, the decryption key 122 is erased immediately after printing. In other embodiments, the decryption key 122 is erased shortly after accessing the confidential information or the printing of the confidential information. Thus, the decryption key 122 no longer exists. Accordingly, if an unauthorized third party "steals" the memory 106 after the confidential information is received by the print device 102 (and before additional information is received which would otherwise overwrite the confidential information), the confidential information cannot be accessed because the decryption key 122 has been erased.

In another embodiment, the decryption key 122 is used for an entire job. Thus, when the current print job communicates a sufficient amount of information such that a plurality of the sheets of paper 138 are printed upon, the decryption key 122 is used for decrypting the information for each sheet of paper 138. At the end of the current print job, the decryption key 122 is then erased from the FAT 112.

In another embodiment, the decryption key 122 is used for an operating period, such as one day. Typically, the print device would be powered down (shut off) at the end of the work day. As part of the power down process, the decryption key 122 is then erased from the FAT 112. In another embodiment, actuation of selector 110 causes the decryption key 122 to be erased from the FAT 112. In yet another embodiment, the decryption key 122 is erased from the FAT 112 on a periodic basis or after a predefined number of sheets of paper 138 have been printed.

For convenience the FAT 112 (having the decryption key 122), data region 114 and security logic 116 (having the encryption logic 118 and the decryption logic 120) are illustrated as residing in a memory 106, illustrated for convenience as a single memory component. It is understood that any of the above elements may reside in other suitable memory components separate from the memory 106 in other embodiments.

Figure 2:
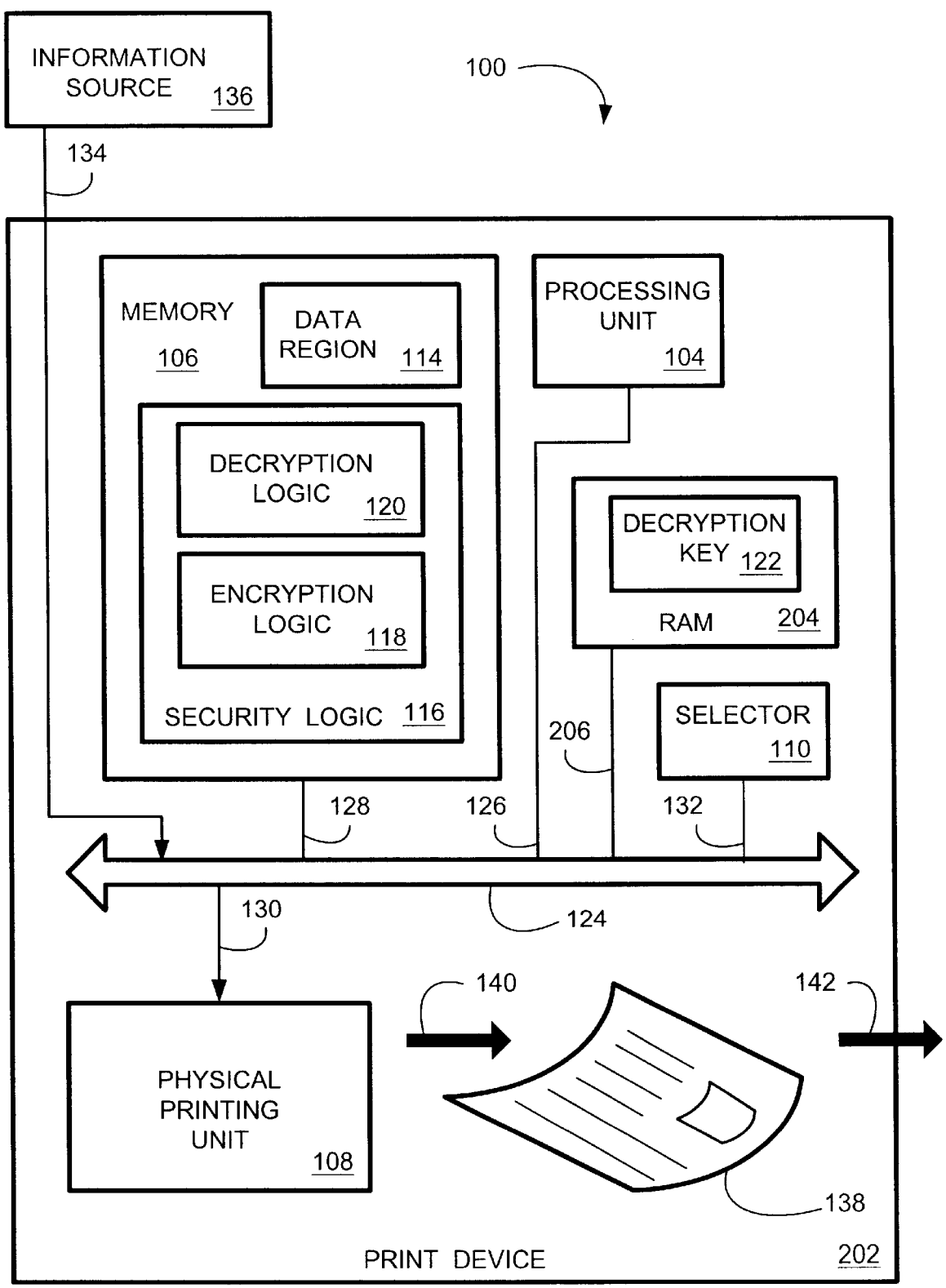
FIG. 2 is a block diagram illustrating another embodiment of a memory security device in accordance with the present invention implemented in a print device.

FIG. 2 is a block diagram illustrating another embodiment of a memory security device 100 in accordance with the present invention implemented in a print device 202. For convenience, like components in FIGS. 1 and 2 are labeled with the same reference numeral. It is understood that the similar components in FIGS. 1 and 2 may have different functionality when the component is a multi-functional component. However, such multi-functional components, with respect to embodiments of the present invention, perform similarly to effect the encryption/decryption of confidential information in accordance with the present invention.

In print device 202, the decryption key 122 is saved into random access memory (RAM) 204, coupled to communication bus 124 via connection 206 (or other suitable intervening components). RAM 204 may be a multi-purpose memory unit. When the print device is powered down (shut off), or when power is removed from RAM 204, the decryption key 122 is erased because RAM 204 is a volatile memory device.

Accordingly, if an unauthorized third party "steals" the memory 106 and RAM 204 after the confidential information is received by the print device 202 (and before additional information is received which would otherwise overwrite the confidential information), the confidential information cannot be accessed because the decryption key 122 was erased when the RAM 204 was removed. Thus, the confidential information has been secured.

Any suitable encryption/decryption technique employing at least a decryption key may be used by embodiments of the present invention. The encryption/decryption technique employed may depend upon the needs of the user. For example, a less complex encryption/decryption technique may be used when processing speed is desirable and the information is not critically confidential. A very complex encryption/decryption technique may be used in instances where the confidential information is very sensitive, such as with "top secret" documents.

It is further understood that the decryption key 122 residing in the FAT 112 may be destroyed using any suitable erasing technique or other suitable process which renders the decryption key 122 unusable. For example, but not limited to, the region of the FAT 112 where the decryption key 122 resides is overwritten with a series of digital "ones" and "zeros" to cause the erasing of the decryption key 122. The series of digital "ones" and "zeros" may be random or predefined depending upon the embodiment.

In one embodiment, optional selector 110 is provided to enable a user to selectively activate the present invention. Thus, when a print job is confidential, the user actuates the selector 110 to cause decryption of received information. If the received information is not confidential, then printing can proceed more quickly by not performing the encryption/decryption of the information according to the present invention. In another embodiment, wherein the encryption/decryption of information according to the present invention is performed on a default basis, actuation of the selector 110 causes the received information (assumed to not be confidential) to be directly printed without performing the encryption/decryption of the information according to the present invention. In embodiments not equipped with the optional selector 110, all received information is encrypted/decrypted according to the present invention. In yet another embodiment, any above-described functionality of selector 110 may be implemented as software and provided as part of the software residing in the information source 136 that generates and communicates the confidential information to the print device 202.

Figure 3:
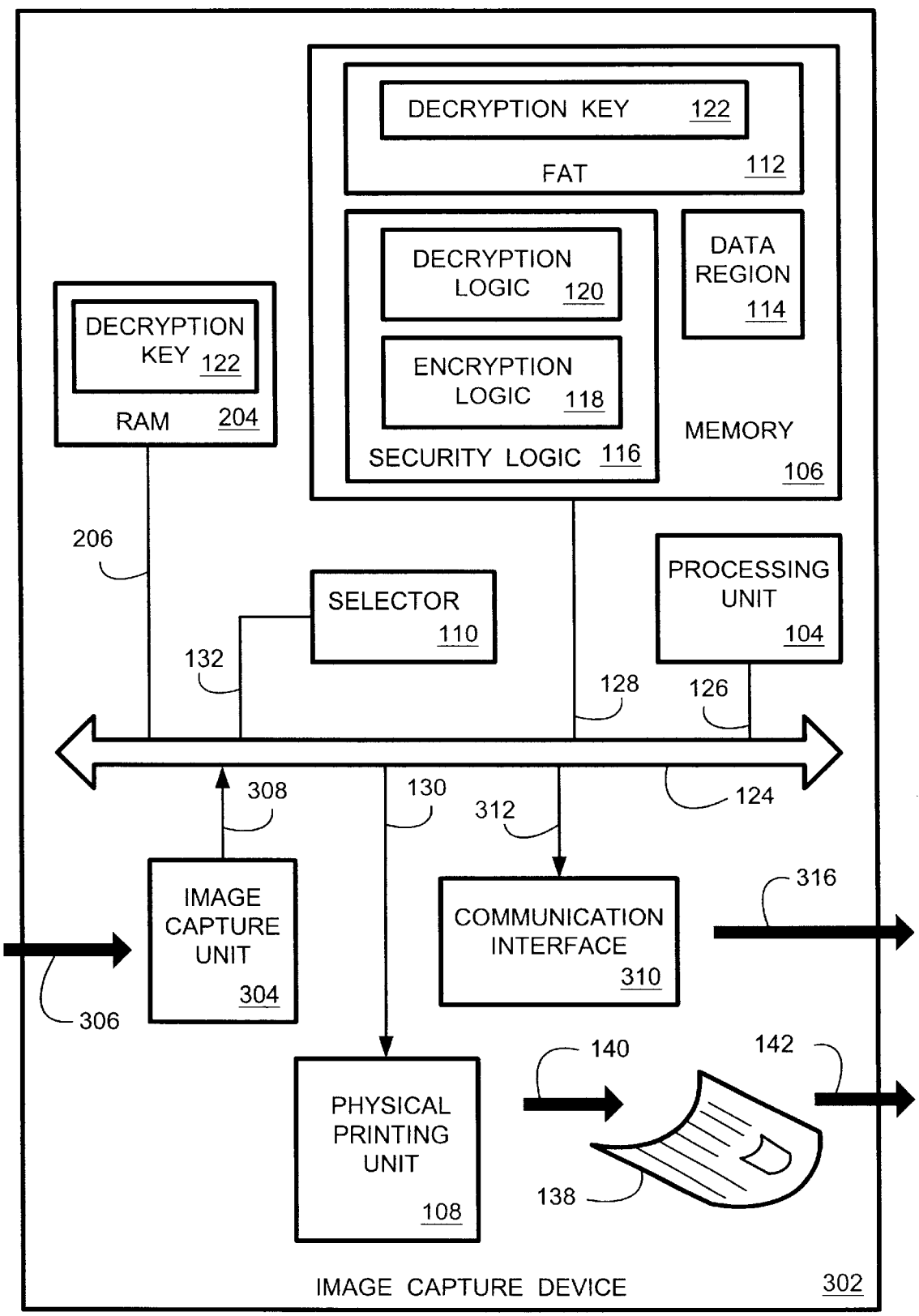
FIG. 3 is a block diagram illustrating an embodiment of a memory security device in accordance with the present invention implemented in an image capture device.

FIG. 3 is a block diagram illustrating an embodiment of a memory security device 100 in accordance with the present invention implemented in an image capture device 302. For convenience, similar components in FIGS. 1–3 are labeled with the same reference numeral. It is understood that the similar components in FIGS. 1–3 may have different functionality when the component is a multi-functional component. However, such multi-functional components, with respect to embodiments of the present invention, perform similarly to effect the encryption/decryption of confidential information in accordance with the present invention.

Image capture device 302 is configured to capture an image of a hardcopy format of the confidential information. Examples of image capture device 302 include, but are not limited to, a copy machine, FAX machine, scanner, telephone, a digital camera or PDA. Generally, the image capture device 302 includes a plurality of photosensitive receptors (not shown) configured to capture light reflected from the hardcopy confidential information. The receptors accumulate charge which is then retrieved by processing unit 104, or another suitable processor, such that an electronic copy of the confidential information is generated.

The components associated with the capture of the confidential information and the subsequent processing to generate the information is generally represented by the block labeled as the image capture unit 304. Capture of the hardcopy confidential information is generally indicated by the arrow 306. Image capture unit 304 is illustrated as communicatively coupled to the communication bus 124 via connection 308 for convenience. Any suitable format of an image capture image unit 304 may be employed by embodiments of the present invention.

The received information corresponding to the captured hard copy confidential information is encrypted using the encryption logic 118 and then saved into the data region 114 of memory 106. Thus, the encrypted information is not useable to an unauthorized third party not in possession of decryption key 122.

In one embodiment, the image capture device 302 is configured to generate printed sheets of paper 138, as described above. When the physical printing unit 108 is ready to print, the encrypted confidential information is retrieved from the data region 114 and decrypted using the decryption logic 120 and the decryption key 122. Thus, the information is printed onto the sheet of paper 138 by the physical printing unit 108, as indicated by arrow 140, and then transported out of the print device, as indicated by arrow 142.

In another embodiment, the image capture device 302 is configured to generate electronic information that is communicated to another device. When the capture device 302 is ready to communicate the output information, the encrypted confidential information is retrieved from the data region 114 and decrypted using the decryption logic 120 and the decryption key 122, and formatted into the output information (data).

Then, the generated electronic output information is transmitted to communication interface 310, via connection 312. Communication interface 310 is configured to communicatively couple to another communication system. The electronic output information is communicated out onto the communication system to an intended recipient and/or device, as indicated by arrow 316.

Any suitable communication interface 310 may be employed by embodiments of the present invention. Thus, image capture device 302 may be configured to couple to a variety of communication systems. For example, image capture device 302 may be configured to communicate with a telephony system. Accordingly, communication interface 310 would comprise a suitable telephone jack and/or modem for coupling to a subscriber loop or switch of the telephony communication system. Similarly, communication interface 310 may be configured to communicate information corresponding to the confidential information to the Internet, a radio frequency (RF) wireless system, a laser system, a microwave communication system, fiber optics system or even a satellite system.

For convenience, the image capture device 302 was described as being configured to generate images on the sheet of paper 138 and configured to communicate electronic output information. Other embodiments may be configured to only generate images on the sheet of paper 138. Other embodiments may be configured to only communicate electronic output information. Furthermore, other embodiments may be configured to receive confidential information from the above described information source 136. It is understood that embodiments of the present invention are not limited by the components and/or characteristic functions of the image capture device 302.

For convenience, the image capture device 302 was described as being configured to save the decryption key 122 into the FAT 112 or into the RAM 204.

Generally, image capture device 302 would employ either the FAT 112 or the RAM 204, or if both the FAT 112 and the RAM 204 were included as components, store the decryption key 122 in a selected one of the FAT 112 or the RAM 204.

After the confidential information has been printed and/or communicated, depending upon the embodiment, the decryption key 122 is erased from the FAT 112 or the RAM 204. Thus, the decryption key 122 no longer exists. Accordingly, if an unauthorized third party "steals" the memory 106 after the confidential information is received by the image capture device 302 (and before additional information is received which would otherwise overwrite the confidential information), the confidential information cannot be accessed because the decryption key 122 has been erased. Thus, the confidential information has been secured.

It is understood that the above-described embodiment variations in the print devices 102, 202 (FIGS. 1 and 2, respectively), are equally applicable to the image capture device 302. For example, the saved information, FAT 112, decryption key 122 and/or security logic 116 may reside is separate suitable memory components. Furthermore, selector 110, as described above, may be employed in some embodiments of the image capture device 302. It is understood that embodiments of the present invention are not limited by the components and/or characteristic functions of the image capture device 302.

Figure 4:
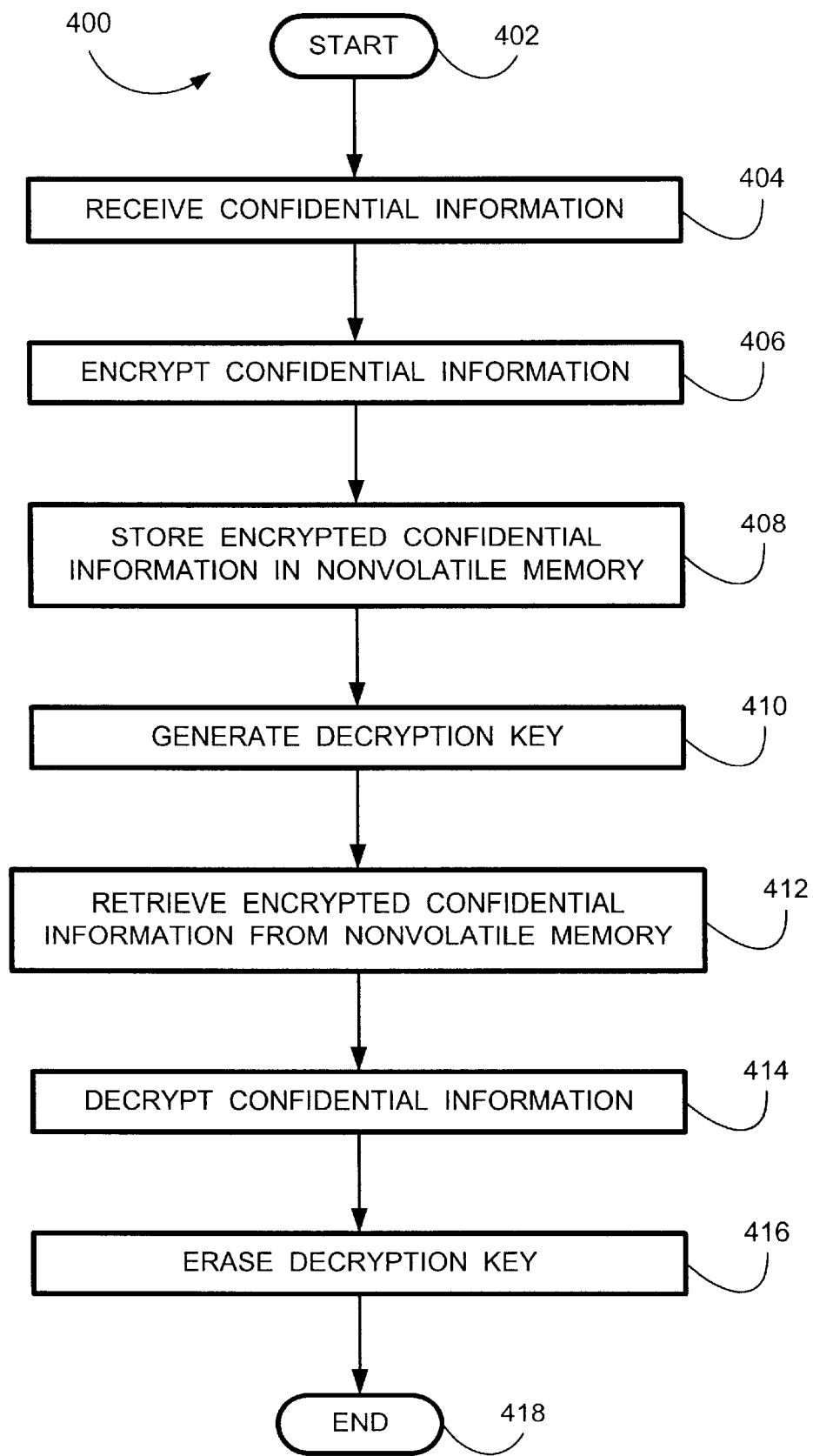
FIG. 4 is a flowchart illustrating an embodiment of a process for implementing the security logic, according to the present invention.

FIG. 4 shows a flow chart 400, according to the present invention, illustrating an embodiment of memory security device 100. The flow chart 400 of FIG. 4 shows the architecture, functionality, and operation of an embodiment for implementing the security logic 116 (FIGS. 1–3), as described above in accordance with the present invention. An alternative embodiment implements the logic of flow chart 400 with hardware configured as a state machine. In this regard, each block may represent a module, segment or portion of code, which comprises one or more executable instructions for implementing the specified logical function (s). It should also be noted that in some alternative implementations, the functions noted in the blocks may occur out of the order noted in FIG. 4, or may include additional functions. For example, two blocks shown in succession in FIG. 4 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention.

The process begins at block 402. At block 404, confidential information is received. At block 406, the confidential information is encrypted. At block 408, the encrypted confidential information is stored in the data region 114 of the internal nonvolatile memory 106 (FIGS. 1–3). At block 410 the decryption key 122 is generated. In one embodiment, the decryption key is stored in the FAT 112 (FIGS. 1 and 3). In another embodiment, the decryption key is stored in the RAM 204 (FIGS. 2 and 3).

At block 412, the encrypted confidential information is retrieved form the nonvolatile memory 106. At block 414 the retrieved encrypted confidential information is decrypted to generate decrypted confidential information. At block 416 the decryption key 122 is erased or otherwise destroyed. The process ends at block 418.

Embodiments of the invention implemented in memory 106 (FIG. 1) may be implemented using any suitable computer-readable medium. In the context of this specification, a "computer-readable medium" can be any means that can store, communicate, propagate, or transport the information associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

Other examples in which embodiments of the present invention may be implemented include digital cameras, facsimile machines, video conferencing devices, telephones with image capture capability, personal device assistants (PDAs), copy machines or other multipurpose devices. It is understood that any suitable device may process confidential information residing in a memory. In such devices, a variety of internal components are configured to access the encrypted confidential information as described herein. After the component accesses the encrypted confidential information in accordance with the present invention and as described hereinbelow, the decryption key is erased.

It should be emphasized that the above-described embodiments of the present invention are merely examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system which secures confidential information, comprising:

a memory configured to save encrypted confidential information;

a printing unit configured to print the confidential information after decryption;

a decryption key; and a processor configured to encrypt the confidential information when received, configured to store the encrypted confidential information in the memory, configured to decrypt the confidential information when the confidential information is accessed by the printing unit, and further configured to erase the decryption key after the printing unit has accessed the confidential information, wherein the memory, the printing unit, the decryption key and the processor reside in a single device.

2. The system of claim 1, wherein the memory further comprises a nonvolatile memory.

3. The system of claim 1, wherein the memory further comprises an internal memory that is difficult to physically access.

4. The system of claim 1, further comprising a selector configured to cause the processor to encrypt the confidential information when the selector is actuated.

5. The system of claim 1, further comprising a selector configured to cause the processor to erase the decryption key when the selector is actuated.

6. The system of claim 1, further comprising a physical printing unit configured to print an image onto at least one sheet of paper, the image corresponding to the confidential information.

7. The system of claim 1, further comprising a communication interface configured to communicate information to another device, the information corresponding to the confidential information.

8. The system of claim 1, wherein the system comprises at least one selected from a group consisting of a personal computer (PC), a print device, a digital camera, a video conferencing device, a telephone with image capture capability, a copy machine, a facsimile (FAX) machine, a scanner and a personal device assistant (PDA).

9. The system of claim 1, further comprising a file allocation table configured to store the decryption key.

10. A method for securing confidential information, the method comprising:
   encrypting the confidential information;
   storing the encrypted confidential information in a memory;
   generating a decryption key;
   decrypting the encrypted confidential information using the decryption key;
   printing the decrypted confidential information; and
   erasing the decryption key,
   wherein the encrypting, storing, generating, decrypting, printing and erasing are performed by components residing in a single device.

11. The method of claim 10, further comprising receiving the confidential information from another device.

12. The method of claim 10, further comprising capturing an image of the confidential information.

13. The method of claim 10, wherein the storing further comprises storing the confidential information in a nonvolatile memory.

14. The method of claim 10, further comprising retrieving the decrypted confidential information from the memory.

15. The method of claim 10, wherein the storing further comprises storing the confidential information in an internal memory that is difficult to physically access.

16. The method of claim 10, further comprising generating an encryption key used to encrypt the confidential information.

17. The method of claim 10, further comprising retrieving the encrypted confidential information from the memory.

18. The method of claim 10, wherein the decrypting further comprises communicating the decrypted confidential information to another component.

19. The method of claim 10, wherein printing the decrypted confidential information further comprises printing an image corresponding to the decrypted confidential information.

20. The method of claim 18, wherein communicating the decrypted confidential information to another component further comprises communicating information corresponding to the decrypted confidential information to another device.

21. The method of claim 10, further comprising actuating a selector such that encrypting is performed.

22. The method of claim 10, further comprising actuating a selector such that encrypting is not performed.

23. The method of claim 10, further comprising actuating a selector such that erasing the decryption key is performed.

24. The method of claim 10, wherein the method is performed by a system residing in the single device that comprises at least one selected from a group consisting of a personal computer (PC), a print device, a digital camera, a video conferencing device, a telephone with image capture capability, a copy machine, a facsimile (FAX) machine, a scanner and a personal device assistant (PDA).

25. The method of claim 10, further comprising:
   storing the decryption key in a file allocation table; and
   deleting the decryption key from the file allocation table after the printing unit has accessed the confidential information.

26. A system for securing confidential information, comprising:
   means for receiving the confidential information;
   means for encrypting the confidential information;
   means for storing the encrypted confidential information in a memory;
   means for generating a decryption key;
   means for decrypting the encrypted confidential information using the decryption key;
   means for printing the decrypted confidential information, and
   means for erasing the decryption key;
   wherein the means for receiving, encrypting, storing, generating, decrypting printing and erasing reside in a single device.

27. The system of claim 26, wherein the means for storing stores the encrypted confidential information in a nonvolatile memory.

28. The system of claim 27, further comprising means for communicating information corresponding to the decrypted confidential information to another device.

29. The system of claim 27, further comprising means for capturing an image of the confidential information.

30. A computer-readable medium having a program for securing confidential information, the program comprising logic configured to perform the functions of:
   generating an encryption key;
   encrypting the confidential information using the encryption key;
   storing the encrypted confidential information in a memory;
   generating a decryption key;
   decrypting the encrypted confidential information using the decryption key;
   printing the decrypted confidential information; and
   erasing the decryption key after the confidential information has been decrypted, wherein the printing is performed by a printing unit residing in a device that executes the program.

* * * * *